US009356915B2

(12) United States Patent
Johnston et al.

(10) Patent No.: US 9,356,915 B2
(45) Date of Patent: May 31, 2016

(54) ENHANCING PRIVACY BY OBSCURING TRAVERSAL USING RELAYS AROUND NETWORK ADDRESS TRANSLATOR (TURN) CONNECTIONS, AND RELATED METHODS, SYSTEMS, AND COMPUTER-READABLE MEDIA

(71) Applicant: Avaya Inc., Basking Ridge, NJ (US)

(72) Inventors: Alan B. Johnston, St. Louis, MO (US); John H. Yoakum, Cary, NC (US)

(73) Assignee: Avaya Inc., Basking Ridge, NJ (US)

( * ) Notice: Subject to any disclaimer, the term of this patent is extended or adjusted under 35 U.S.C. 154(b) by 53 days.

(21) Appl. No.: 14/164,332

(22) Filed: Jan. 27, 2014

(65) Prior Publication Data
US 2015/0215290 A1    Jul. 30, 2015

(51) Int. Cl.
*H04L 29/06* (2006.01)
*H04L 29/12* (2006.01)

(52) U.S. Cl.
CPC ........ *H04L 63/0428* (2013.01); *H04L 61/2539* (2013.01); *H04L 61/2589* (2013.01); *H04L 63/0421* (2013.01)

(58) Field of Classification Search
CPC ............ H04L 63/0407; H04L 63/0428; H04L 63/0421
See application file for complete search history.

(56) References Cited

PUBLICATIONS

Mahy et al., Traveral Using Relays around NAT (RFC 5766), Apr. 2010, Internet Engineering Task Force (IETF).*

Johnston et al., "WebRTC: APIs and RTCWEB Protocols of the HTML5 Real-Time Web," (Book), Second Edition, Smashwords Edition, Digital Codex LLC, Jun. 2013, 254 pages.
Many et al., "Traversal Using Relays around NAT (TURN) : Relay Extensions to Session Traversal Utilities for NAT (STUN)," Internet Engineering Task Force, Request for Comments: 5766, Standards Track, IETF Trust, Apr. 2010, 61 pages.
Rosenberg et al., "Interactive Connectivity Establishment (ICE): A Protocol for Network Address Translator (NAT) Traversal for Offer/Answer Protocols," Network Working Group, Request for Comments: 5245, Standards Track, Internet Engineering Task Force (IETF), Apr. 2010, 234 pages.

* cited by examiner

*Primary Examiner* — Izunna Okeke
(74) *Attorney, Agent, or Firm* — Withrow & Terranova, PLLC (57) ABSTRACT

Enhancing privacy by obscuring Traversal Using Relays around Network Address Translator (TURN) connections, and related methods, systems, and computer-readable media are disclosed herein. In one embodiment, a method comprises obtaining, by a TURN client, one or more candidate addresses comprising a TURN relayed transport address of a TURN server. The method further comprises generating a camouflaged candidate list, based on the candidate addresses, in which the TURN relayed transport address is obscured; generating a connection setup message comprising the camouflaged candidate list; and sending the connection setup message to a TURN peer executing on a computing device. In another embodiment, a method comprises receiving, by a TURN server, a request for a provision of a first TURN service from a TURN client to connect to a TURN peer. The method further comprises masking a presence of the TURN server to the TURN peer, and relaying communications based on the masking.

12 Claims, 8 Drawing Sheets

FIG. 1

| PROTOCOLS (50) | PRIORITY WEIGHTS (52) | IP ADDRESSES (54) | PORT NUMBERS (56) | ADDRESS TYPES (58) |
|---|---|---|---|---|
| UDP | 3 | 243.38.12.12 | 50036 | RELAY |
| UDP | 2 | 172.150.105.161 | 50032 | SERVER REFLEXIVE |
| UDP | 1 | 192.168.168.108 | 57309 | HOST |
| UDP | 1 | 10.0.0.46 | 50033 | HOST |

EXEMPLARY CAMOUFLAGED CANDIDATE LIST (46)

CANDIDATE ADDRESSES (48)

ENHANCING PRIVACY BY OBSCURING TRAVERSAL USING RELAYS AROUND NETWORK ADDRESS TRANSLATOR (TURN) CONNECTIONS, AND RELATED METHODS, SYSTEMS, AND COMPUTER-READABLE MEDIA

BACKGROUND

1. Field of the Disclosure

The technology of the disclosure relates generally to Traversal Using Relays around Network Address Translator (TURN) connections, and, in particular, to enhancing privacy of TURN connections between TURN clients and TURN servers.

2. Technical Background

A host (e.g., a computing device connected to a network) located behind a Network Address Translator (NAT) device or system may wish to communicate with other hosts, some of which may also be located behind NATs. To do this, the hosts may use "hole punching" techniques in an attempt to discover a direct communications path that connects one computing device to another through intervening NATs and/or routers, but that does not traverse any relays. However, hole punching techniques may be unsuccessful if one or both hosts are located behind NATs that are configured with mapping behaviors incompatible with direct communications paths. For instance, NATs that are configured with a mapping behavior of "address-dependent mapping" or "address- and port-dependent mapping," as non-limiting examples, may impede direct communications paths between hosts.

When a direct communications path cannot be found, it may be necessary to employ an intermediate host to relay communications between the two hosts. One protocol for relaying communications, described in the Internet Engineering Task Force (IETF) Request for Comments (RFC) 5766 (available online at, e.g., http://tools.ietf.org/search/rfc5766), is known as Traversal Using Relays around NAT (TURN). The TURN protocol allows a host (referred to herein as a "TURN client") to request that a TURN server act as an intermediate host to relay communications to and from other hosts (referred to as "TURN peers"). To accomplish this, the TURN client obtains a TURN relayed transport address from the TURN server. The TURN relayed transport address includes an Internet Protocol (IP) address and port on the TURN server through which network communications may be passed between the TURN client and the TURN peer. For instance, communications sent by the TURN peer to the TURN relayed transport address are sent by the TURN server to the TURN client. Communications sent by the TURN client to the TURN relayed transport address are sent by the TURN server to the TURN peer using the TURN relayed transport address as the source address.

However, the use of a TURN server may raise concerns with respect to privacy of a TURN client. Although use of the TURN server hides the topology of the network to which the TURN client is connected, information that may potentially compromise the privacy of the TURN client may be leaked during setup of the TURN connection and/or by characteristics of a TURN connection between the TURN client and the TURN server. For example, a TURN peer may be able to determine, based on the candidate addresses received from the TURN client during connection setup, that the TURN server is being used, and thus that the TURN client may be trying to hide or obfuscate its address. Similarly, if the TURN peer can detect that the TURN server is used for multiple communications sessions, the TURN peer may be able to determine that the multiple communications sessions are associated with the same TURN client.

SUMMARY OF THE DETAILED DESCRIPTION

Embodiments disclosed in the detailed description provide enhancing privacy by obscuring Traversal Using Relays around Network Address Translator (TURN) connections. Related methods, systems, and computer-readable media are also disclosed. In this regard, in one embodiment, a method for obscuring TURN connections is provided. The method comprises obtaining, by a TURN client executing on a first computing device, one or more candidate addresses associated with the TURN client, the one or more candidate addresses comprising a TURN relayed transport address provided by a TURN server. The method further comprises generating a camouflaged candidate list, based on the one or more candidate addresses, in which the TURN relayed transport address is obscured. The method also comprises generating a connection setup message comprising the camouflaged candidate list and directed to a TURN peer executing on a second computing device, and sending the connection setup message to the second computing device.

In another embodiment, a method for obscuring TURN connections is provided. The method comprises receiving, by a TURN server executing on a computing device, a request for a provision of a first TURN service from a TURN client to connect to a TURN peer. The method further comprises masking, by the TURN server, a presence of the TURN server to the TURN peer. The method also comprises relaying, by the TURN server, communications between the TURN client and the TURN peer based on the masking.

In another embodiment, a system for obscuring TURN connections is provided. The system comprises a TURN client executing on a first computing device. The TURN client is communicatively coupled to a TURN server, and is configured to obtain one or more candidate addresses associated with the TURN client, the one or more candidate addresses comprising a TURN relayed transport address provided by the TURN server. The TURN client is further configured to generate a camouflaged candidate list, based on the one or more candidate addresses, in which the TURN relayed transport address is obscured. The TURN client is also configured to generate a connection setup message comprising the camouflaged candidate list and directed to a TURN peer, and send the connection setup message to a second computing device.

In another embodiment, a system for obscuring TURN connections is provided. The system comprises a TURN server executing on a first computing device. The TURN server is communicatively coupled to a TURN client, and is configured to receive a request for a provision of a first TURN service from the TURN client to connect to a TURN peer. The TURN server is further configured to mask a presence of the TURN server to the TURN peer. The TURN server is also configured to relay communications between the TURN client and the TURN peer based on the masking.

In another embodiment, a non-transitory computer-readable medium having stored thereon computer-executable instructions to cause a processor to implement a method for obscuring TURN connections is provided. The method implemented by the computer-executable instructions comprises obtaining, by a TURN client executing on a first computing device, one or more candidate addresses associated with the TURN client, the one or more candidate addresses comprising a TURN relayed transport address provided by a TURN server. The method implemented by the computer-executable instructions further comprises generating a camouflaged candidate list, based on the one or more candidate addresses, in which the TURN relayed transport address is obscured. The method implemented by the computer-executable instructions also comprises generating a connection setup message comprising the camouflaged candidate list and directed to a TURN peer executing on a second computing device, and sending the connection setup message to the second computing device.

In another embodiment, a non-transitory computer-readable medium having stored thereon computer-executable instructions to cause a processor to implement a method for obscuring TURN connections is provided. The method implemented by the computer-executable instructions comprises receiving, by a TURN server executing on a computing device, a request for a provision of a first TURN service from a TURN client to connect to a TURN peer. The method implemented by the computer-executable instructions further comprises masking, by the TURN server, a presence of the TURN server to the TURN peer. The method implemented by the computer-executable instructions also comprises relaying, by the TURN server, communications between the TURN client and the TURN peer based on the masking.

BRIEF DESCRIPTION OF THE FIGURES

The accompanying drawing figures incorporated in and forming a part of this specification illustrate several aspects of the disclosure, and together with the description serve to explain the principles of the disclosure.

DETAILED DESCRIPTION

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description provide enhancing privacy by obscuring Traversal Using Relays around Network Address Translator (TURN) connections. Related methods, systems, and computer-readable media are also disclosed. In this regard, in one embodiment, a method for obscuring TURN connections is provided. The method comprises obtaining, by a TURN client executing on a first computing device, one or more candidate addresses associated with the TURN client, the one or more candidate addresses comprising a TURN relayed transport address provided by a TURN server. The method further comprises generating a camouflaged candidate list, based on the one or more candidate addresses, in which the TURN relayed transport address is obscured. The method also comprises generating a connection setup message comprising the camouflaged candidate list and directed to a TURN peer executing on a second computing device, and sending the connection setup message to the second computing device.

In another embodiment, a method for obscuring TURN connections is provided. The method comprises receiving, by a TURN server executing on a computing device, a request for a provision of a first TURN service from a TURN client to connect to a TURN peer. The method further comprises masking, by the TURN server, a presence of the TURN server to the TURN peer. The method also comprises providing, by the TURN server, the first TURN service to the TURN client.

Figure 1:
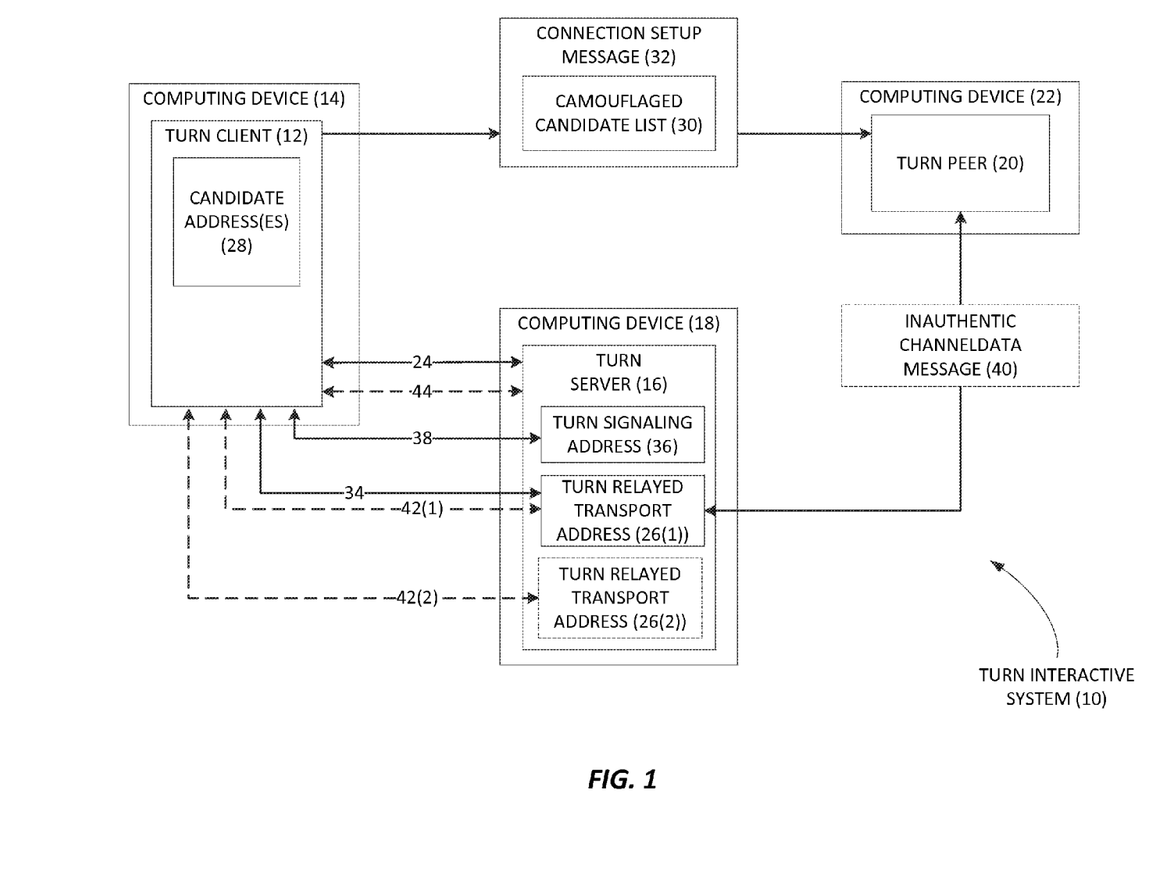
FIG. 1 is a conceptual diagram illustrating an interactive Traversal Using Relays around Network Address Translator (TURN) system including a TURN client and a TURN server for enhancing privacy by obscuring TURN connections.

FIG. 1 illustrates an exemplary TURN interactive system 10 providing enhanced privacy by obscuring TURN connections as disclosed herein. In particular, the exemplary TURN interactive system 10 provides a TURN client 12 that executes on a computing device 14, and a TURN server 16 that executes on a computing device 18. The TURN server 16 may relay communications between the TURN client 12 and a TURN peer 20 executing on a computing device 22. In this manner, obstacles such as a Network Address Translator (NAT) system or device (not shown) that may impede a direct communications path between the TURN client 12 and the TURN peer 20 may be traversed using TURN services provided by the TURN server 16.

It is to be understood that the computing devices 14, 18, and 22 may all be located within the same public or private network, or may be located within separate, communicatively coupled public or private networks. Some embodiments of the TURN interactive system 10 of FIG. 1 may provide that each of the computing devices 14, 18, and 22 may be any computing device having network communications capabilities, such as a smartphone, a tablet computer, a dedicated web appliance, a media server, a desktop or server computer, or a purpose-built communications device, as non-limiting examples. In some embodiments, the elements of the computing devices 14, 18, and 22 may be distributed across more than one computing device 14, 18, and 22.

Before operations of the TURN client 12 and the TURN server 16 for enhancing privacy are discussed, the establishment of communications in a conventional TURN interactive system is described. The TURN client 12 first sends a request 24 for provision of a TURN service (such as a request for a TURN allocation, as a non-limiting example) to the TURN server 16. In response to the request 24, the TURN server 16 provides a TURN relayed transport address 26 to the TURN client 12. The TURN relayed transport address 26 is an Internet Protocol (IP) address and port, provided by the TURN server 16, through which communications may be relayed between the TURN client 12 and the TURN peer 20.

The TURN client 12 then exchanges connection setup messages (not shown) with the TURN peer 20, where each connection setup message contains candidate addresses by which the TURN client 12 and the TURN peer 20 may each be reached by the other. Each candidate address may include information such as an IP address and port, a protocol, a priority weight, and/or a candidate address type, as non-limiting examples. Next, a process known as "hole punching" is carried out to determine the most appropriate communications path between the TURN client 12 and the TURN peer 20 based on the exchanged candidate addresses. Hole punching techniques may be based on the Interactive Connectivity Establishment (ICE) approach, as described in the IETF RFC 5245 (available online at, e.g., http://tools.ietf.org/search/rfc5245). Because of the high bandwidth requirements of TURN connections, hole punching techniques will typically favor a direct connection between the TURN client 12 and the TURN peer 20 over a connection via the TURN server 16, if possible.

However, use of a conventional TURN interactive system may raise concerns with respect to privacy of the TURN client 12. Although use of the TURN server 16 hides the topology of the network to which the TURN client 12 is connected, information that potentially compromises the privacy of the TURN client 12 may still be leaked during setup of a TURN connection and/or by characteristics of the TURN connection. For example, the TURN peer 20 may be able to determine, based on the candidate addresses received from the TURN client 12 during connection setup, that the TURN server 16 is being used, and thus that the TURN client 12 may be trying to hide or obfuscate its address. Similarly, if the TURN peer 20 can detect that the TURN server 16 is used for multiple communications sessions, the TURN peer 20 may be able to determine that the multiple communications sessions are associated with the same TURN client 12.

In this regard, the TURN client 12 and the TURN server 16 are provided to enhance privacy by obscuring TURN connections within the TURN interactive system 10. In some embodiments of the TURN interactive system 10, the TURN client 12 is configured to obscure TURN connections by disguising the TURN relayed transport address 26 allocated by the TURN server 16 within the candidate list provided to the TURN peer 20. The TURN client 12 begins by obtaining one or more candidate addresses 28 that are associated with the TURN client 12, and that include IP address(es) and port(s) through which the TURN peer 20 may attempt to connect to the TURN client 12. Obtaining the one or more candidate addresses 28 may include sending the request 24 for provision of a TURN service (such as a request for a TURN allocation, as a non-limiting example) to the TURN server 16, and receiving the TURN relayed transport address 26 from the TURN server 16.

Based on the one or more candidate addresses 28, the TURN client 12 then generates a camouflaged candidate list 30 to include in a connection setup message 32 to send to the TURN peer 20. As used herein, the "camouflaged candidate list" refers to a list of candidate addresses, including the TURN relayed transport address 26, in which the TURN relayed transport address 26 is obscured (i.e., not readily identifiable as a TURN relayed transport address 26). In some embodiments, the TURN client 12 may generate the camouflaged candidate list 30 to obscure the TURN relayed transport address 26 by identifying the TURN relayed transport address 26 as a server reflexive candidate address (as opposed to a relay candidate address or a host candidate address, as non-limiting examples). As is known in the art, a server reflexive candidate address may typically be associated with a NAT, while a relay candidate address may generally be associated with a TURN server and a host candidate address may generally be associated with a TURN client. By identifying the TURN relayed transport address 26 as a server reflexive candidate address in the camouflaged candidate list 30, the TURN client 12 may make the presence of the TURN relayed transport address 26 less obvious.

Some embodiments may provide that the TURN client 12 generates the camouflaged candidate list 30 to obscure the TURN relayed transport address 26 by providing an inauthentic TURN relayed transport address in the camouflaged candidate list 30. The TURN client 12 may further designate the inauthentic TURN relayed transport address as having a higher priority than the TURN relayed transport address 26 in the camouflaged candidate list 30. In this manner, the TURN client 12 may make it more difficult for the TURN peer 20 to identify the TURN relayed transport address 26 in the camouflaged candidate list 30, while still maintaining the ability to establish a TURN connection using the TURN relayed transport address 26. For example, during the process of hole punching, a connection via the higher-priority but inauthentic TURN relayed transport address may be attempted, but will fail. The hole punching protocol may then fall back to the TURN relayed transport address 26 to establish a TURN connection.

According to some embodiments herein, the TURN client 12 may generate the camouflaged candidate list 30 to obscure the TURN relayed transport address 26 by providing an inauthentic private address (i.e., a private address not associated with the TURN client 12) in the camouflaged candidate list 30. As non-limiting examples, the TURN client 12 may provide an inauthentic private address from a private address space encompassing IP addresses 10.0.0.0 to 10.255.255.255 and/or a private address space encompassing IP addresses 192.168.0.0 to 192.168.255.255. In doing so, the TURN client 12 may obfuscate an actual private address that may be associated with the TURN client 12, while also avoiding suspicion that may be raised if a private address is not provided in the camouflaged candidate list 30.

Some embodiments of the TURN interactive system 10 may provide that the TURN server 16 is configured to obscure TURN connections by masking a presence of the TURN server 16 to the TURN peer 20. The TURN server 16 may receive the request 24 for a provision of a TURN service (requesting a TURN allocation, as a non-limiting example) from the TURN client 12 to connect to the TURN peer 20. The TURN server 16 may then carry out operations to mask the presence of the TURN server 16 to the TURN peer 20 before relaying communications 34 between the TURN client 12 and the TURN peer 20 based on the masking.

In some embodiments, the TURN server 16 may be configured to mask a presence of the TURN server 16 by employing different addresses for TURN signaling and TURN relaying operations. Accordingly, the TURN server 16 may allocate a TURN signaling address 36 for communicating TURN messages 38 between the TURN server 16 and the TURN client 12. The TURN server 16 further may allocate the TURN relayed transport address 26, different from the TURN signaling address 36, for relaying the communications 34 between the TURN client 12 and the TURN peer 20. In some embodiments, the TURN signaling address 36 and the TURN relayed transport address 26 may reside in different subnets and/or different address blocks. In this manner, the likelihood of TURN messages for signaling being associated with TURN relaying traffic by an observer such as the TURN peer 20 may be minimized.

Some embodiments may provide that the TURN server 16 is configured to mask a presence of the TURN server 16 by ensuring that an inauthentic ChannelData message 40 received from the TURN peer 20 does not generate an error response by the TURN server 16. ChannelData messages are messages sent between the TURN peer 20 and the TURN server 16 to send and receive data via the TURN relayed transport address 26. If the TURN server 16 responds to the inauthentic ChannelData message 40 with an error message, the presence of the TURN server 16 could be revealed. Instead, the TURN server 16 may silently discard the inauthentic ChannelData message 40.

According to some embodiments disclosed herein, the TURN server 16 may be configured to mask a presence of the TURN server 16 by allocating a TURN relayed transport address 26 that is unaffiliated with an enterprise server farm (not shown). A TURN relayed transport address 26 that appears to be affiliated with an enterprise server farm may be considered more likely to be associated with the TURN server 16 and less likely to be an end user's actual IP address. As a result, a reverse IP query on the TURN relayed transport address 26 may indicate the presence of the TURN server 16 to an outside observer such as the TURN peer 20. By allocating the TURN relayed transport address 26 that is unaffiliated with an enterprise server farm, the TURN server 16 may further mask its presence to the TURN peer 20.

In some embodiments, the TURN server 16 may be configured to mask a presence of the TURN server 16 by selecting a second TURN relayed transport address 26(2) for a TURN communications session based on a first TURN relayed transport address 26(1) used in a previous communications session. For example, the TURN server 16 may employ a consistent strategy of selecting the second TURN relayed transport address 26(2) that is different from the first TURN relayed transport address 26(1). In this manner, communications 42(2) may be relayed to the TURN client 12 without the TURN peer 20 being able to associate a single TURN relayed transport address 26 with the TURN client 12. In some embodiments, the TURN server 16 may base the selection of the second TURN relayed transport address 26(2) on whether a request 44 for provision of a TURN service was received from the same TURN client 12 as the request 24. If so, the TURN server 16 may select the second TURN relayed transport address 26(2) that is the same as the first TURN relayed transport address 26(1). Communications 42(1) may be relayed to the TURN client 12 without raising suspicion as to changing TURN relayed transport addresses 26 between communication sessions.

Figure 2:
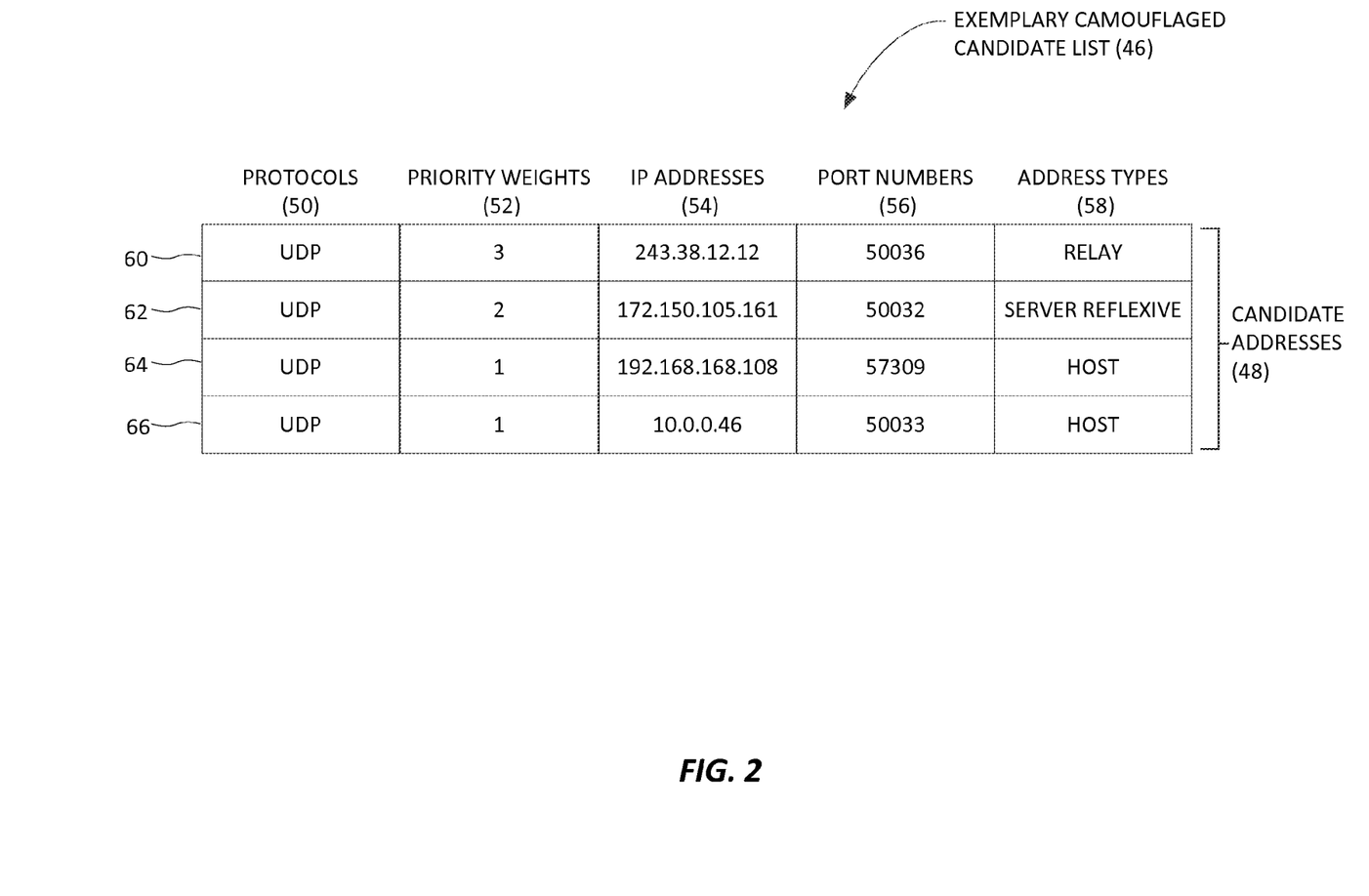
FIG. 2 is a diagram illustrating an exemplary camouflaged candidate list that may be generated by the TURN client of FIG. 1 to obfuscate a TURN relayed transport address in the camouflaged candidate list.

To illustrate an exemplary camouflaged candidate list 46 that may be generated by the TURN client 12 of FIG. 1 to obscure a TURN connection, FIG. 2 is provided. As seen in FIG. 2, the camouflaged candidate list 46 includes candidate addresses 48. The candidate addresses 48 include columns or fields identifying protocols 50, priority weights 52, IP addresses 54, port numbers 56, and address types 58 of the candidate addresses 48. The protocols 50 for the candidate addresses 48 may include, for example, User Datagram Protocol (UDP) and Transport Control Protocol (TCP), among others. The priority weights 52 may be used by a hole punching protocol to determine a preference among the candidate addresses 48. For instance, higher values for the priority weights 52 may indicate the candidate addresses 48 that are more preferred. The IP addresses 54 and the port numbers 56 together indicate network addresses associated with the candidate addresses 48, while the address types 58 indicate whether the candidate addresses 48 are server reflexive candidate addresses, relay candidate addresses, or host candidate addresses, as non-limiting examples.

In the example of FIG. 2, the camouflaged candidate list 46 demonstrates how a candidate address 48 associated with a TURN server may be obfuscated. The camouflaged candidate list 46 includes an inauthentic TURN relayed transport address 60, a TURN relayed transport address 62 (e.g., the TURN relayed transport address 26 of FIG. 1), a private address 64 associated with the TURN client 12 of FIG. 1, and an inauthentic private address 66. The inauthentic TURN relayed transport address 60 is identified as a relay candidate address (typically associated with TURN servers) and is assigned the highest priority weight 52. In fact, however, the inauthentic TURN relayed transport address 60 is not a valid TURN server IP address. In contrast, the TURN relayed transport address 62 is authentic, and is assigned a lower priority weight 52 than the inauthentic TURN relayed transport address 60. The TURN relayed transport address 62 is also identified as being of type "SERVER REFLEXIVE," which is typically associated with a NAT device rather than a TURN server. Accordingly, the likelihood of the TURN relayed transport address 62 being identified as a genuine TURN server address is reduced. Similarly, both the private address 64 associated with the TURN client 12 and the inauthentic private address 66 are provided in the camouflaged candidate list 46, diminishing the ability of an observer to determine which is genuine.

Figure 3:
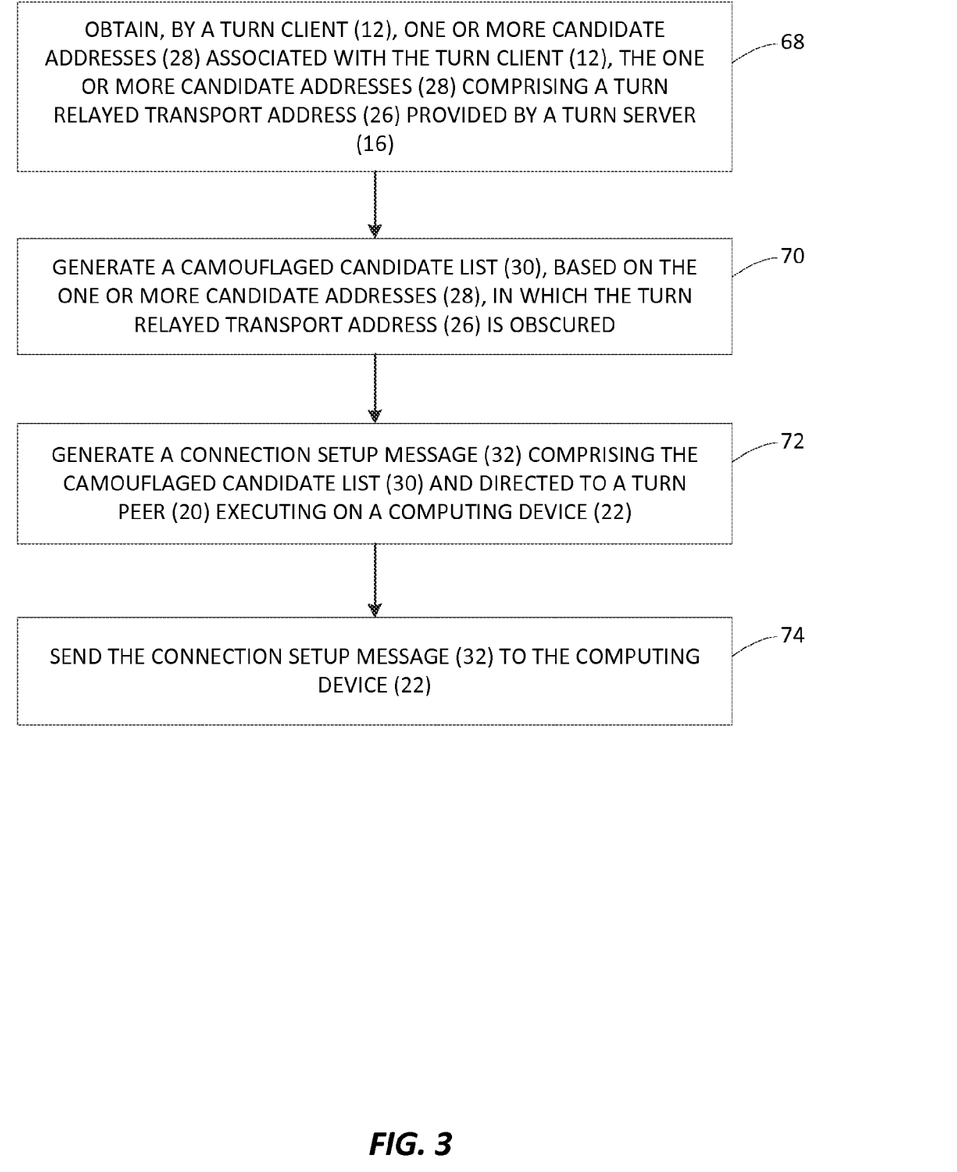
FIG. 3 is a flowchart illustrating exemplary operations of the TURN client of FIG. 1 for obscuring TURN connections.

As discussed above, the TURN client 12 of FIG. 1 may be configured to enhance privacy by obscuring TURN connections. In this regard, FIG. 3 is provided to illustrate exemplary operations of the TURN client 12 of FIG. 1 for obscuring TURN connections. For the sake of clarity, elements of FIG. 1 are referenced in describing FIG. 3. In FIG. 3, operations begin with the TURN client 12 obtaining one or more candidate addresses 28 associated with the TURN client 12 (block 68). The one or more candidate addresses 28 include a TURN relayed transport address 26 provided by a TURN server 16.

The TURN client 12 then generates a camouflaged candidate list 30, based on the one or more candidate addresses 28, in which the TURN relayed transport address 26 is obscured (block 70). As discussed above, the TURN relayed transport address 26 may be obscured by identifying the TURN relayed transport address 26 as a server reflexive candidate address in the camouflaged candidate list 30, by including an inauthentic TURN relayed transport address in the camouflaged candidate list 30, and/or by including an inauthentic private address in the camouflaged candidate list 30. The TURN client 12 next generates a connection setup message 32 comprising the camouflaged candidate list 30, and directed to a TURN peer 20 executing on a computing device 22 (block 72). The TURN client 12 then sends the connection setup message 32 to the computing device 22 (block 74).

Figure 4:
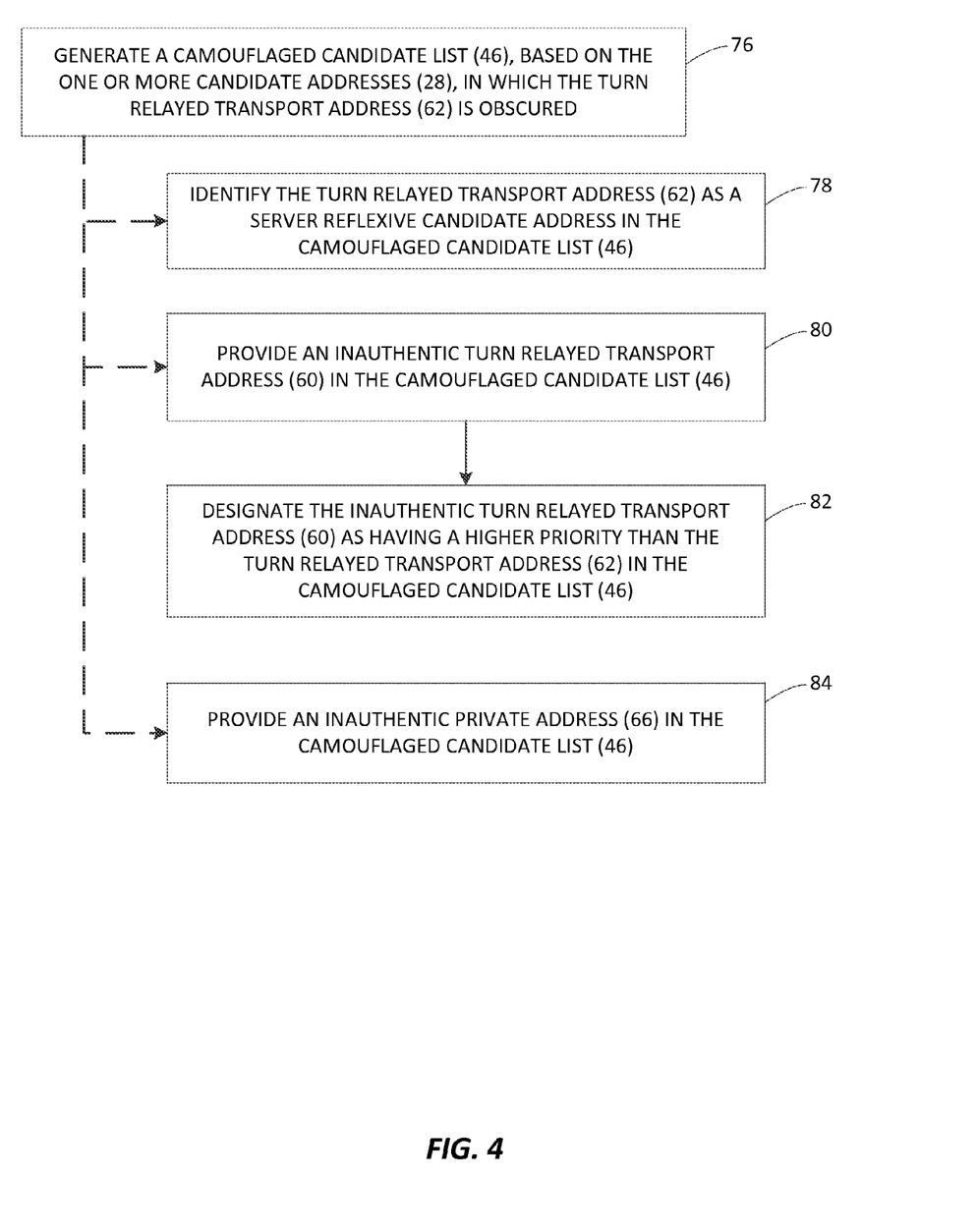
FIG. 4 is a flowchart illustrating further exemplary operations of the TURN client of FIG. 1 for generating a camouflaged candidate list.

FIG. 4 is a flowchart illustrating further exemplary operations of the TURN client 12 of FIG. 1 for generating the camouflaged candidate list 46 of FIG. 2. Elements of FIGS. 1 and 2 are referenced for the sake of clarity in describing FIG. 4. In FIG. 4, block 76 represents operations for generating a camouflaged candidate list 46, based on the one or more candidate addresses 28, in which the TURN relayed transport address 62 is obscured. It is to be understood that the operations of block 76 of FIG. 4 correspond to the operations of block 70 of FIG. 3.

In some embodiments, the operations of block 76 in FIG. 4 for generating the camouflaged candidate list 46 may include the TURN client 12 identifying the TURN relayed transport address 62 as a server reflexive candidate address in the camouflaged candidate list 46 (block 78). As discussed above, a server reflexive candidate address is typically associated with a NAT rather than a TURN server. Accordingly, by identifying the TURN relayed transport address 62 as a server reflexive candidate address, the presence of the TURN relayed transport address 62 in the camouflaged candidate list 46 may be made less obvious.

Some embodiments may provide that the operations of block 76 for generating the camouflaged candidate list 46 include the TURN client 12 providing an inauthentic TURN relayed transport address 60 in the camouflaged candidate list 46 (block 80). The TURN client 12 may then designate the inauthentic TURN relayed transport address 60 as having a higher priority than the TURN relayed transport address 62 in the camouflaged candidate list 46 (block 82). The inauthentic TURN relayed transport address 60 may thus obscure the presence of the TURN relayed transport address 62 by appearing to be a genuine TURN server address.

According to some embodiments herein, the operations of block 76 for generating the camouflaged candidate list 46 may include the TURN client 12 providing an inauthentic private address 66 in the camouflaged candidate list 46 (block 84). For instance, the inauthentic private address 66 may be selected from a private address space encompassing IP addresses 10.0.0.0 to 10.255.255.255 and/or a private address space encompassing IP addresses 192.168.0.0 to 192.168.255.255, as non-limiting examples. In this manner, an actual private address that may be associated with the TURN client 12, such as the private address 64 of FIG. 2, may be obscured in the camouflaged candidate list 46.

Figure 5:
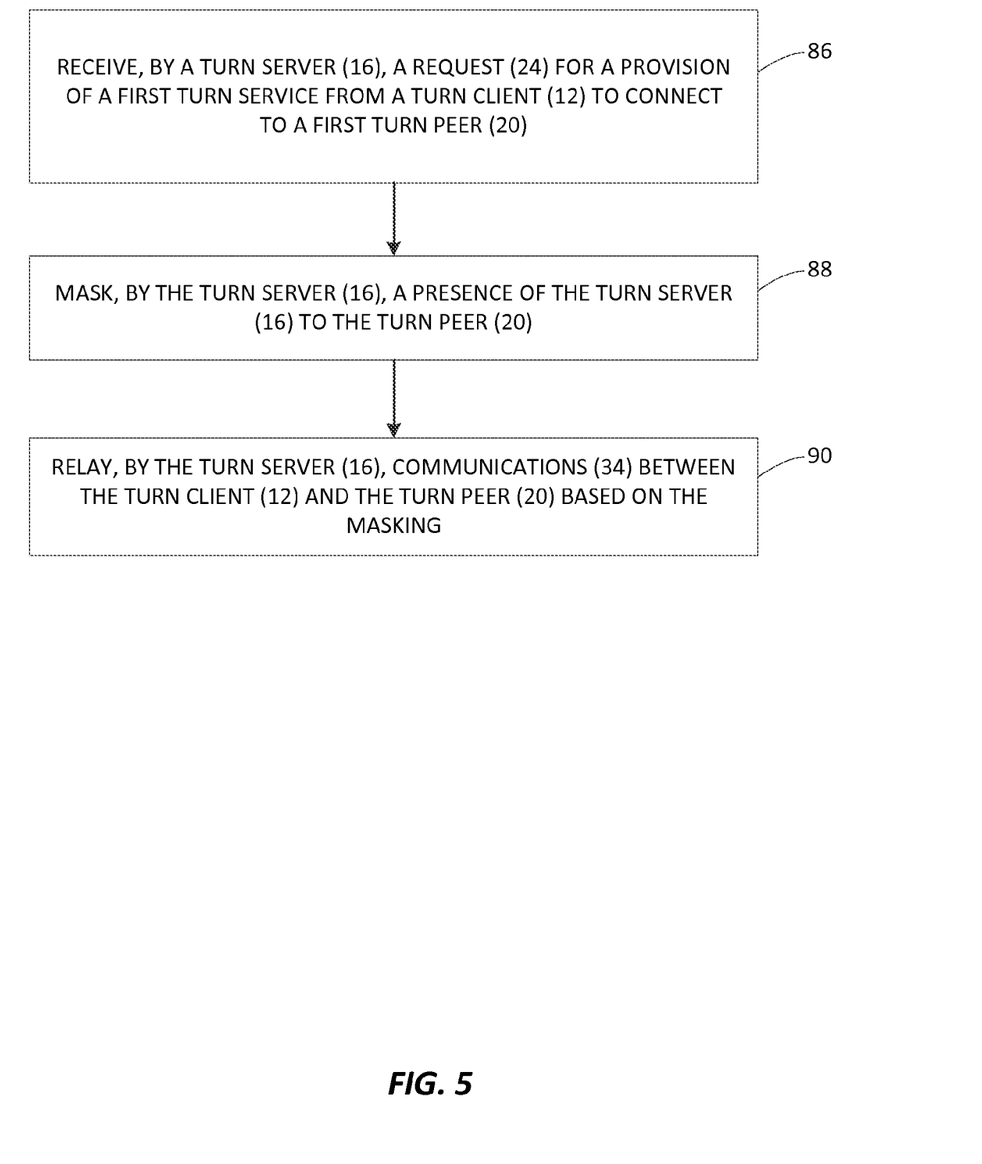
FIG. 5 is a flowchart illustrating exemplary operations of the TURN server of FIG. 1 for obscuring TURN connections.

As noted above, privacy may also be enhanced by the TURN server 16 of FIG. 1 obscuring TURN connections. Accordingly, FIG. 5 is provided to illustrate exemplary operations of the TURN server 16 of FIG. 1 for obscuring of TURN connections. For the sake of clarity, elements of FIG. 1 are referenced in describing FIG. 5. In FIG. 5, operations begin with the TURN server 16 receiving a request 24 for a provision of a first TURN service from a TURN client 12 to connect to a TURN peer 20 (block 86). The request 24 may be, for instance, a request for a TURN allocation by the TURN server 16.

The TURN server 16 next masks a presence of the TURN server 16 to the TURN peer 20 (block 88). Exemplary operations for masking the presence of the TURN server 16 to the TURN peer 20 are discussed in greater detail below with respect to FIG. 6. The TURN server 16 then relays communications 34 between the TURN client 12 and the TURN peer 20 based on the masking (block 90).

Figure 6:
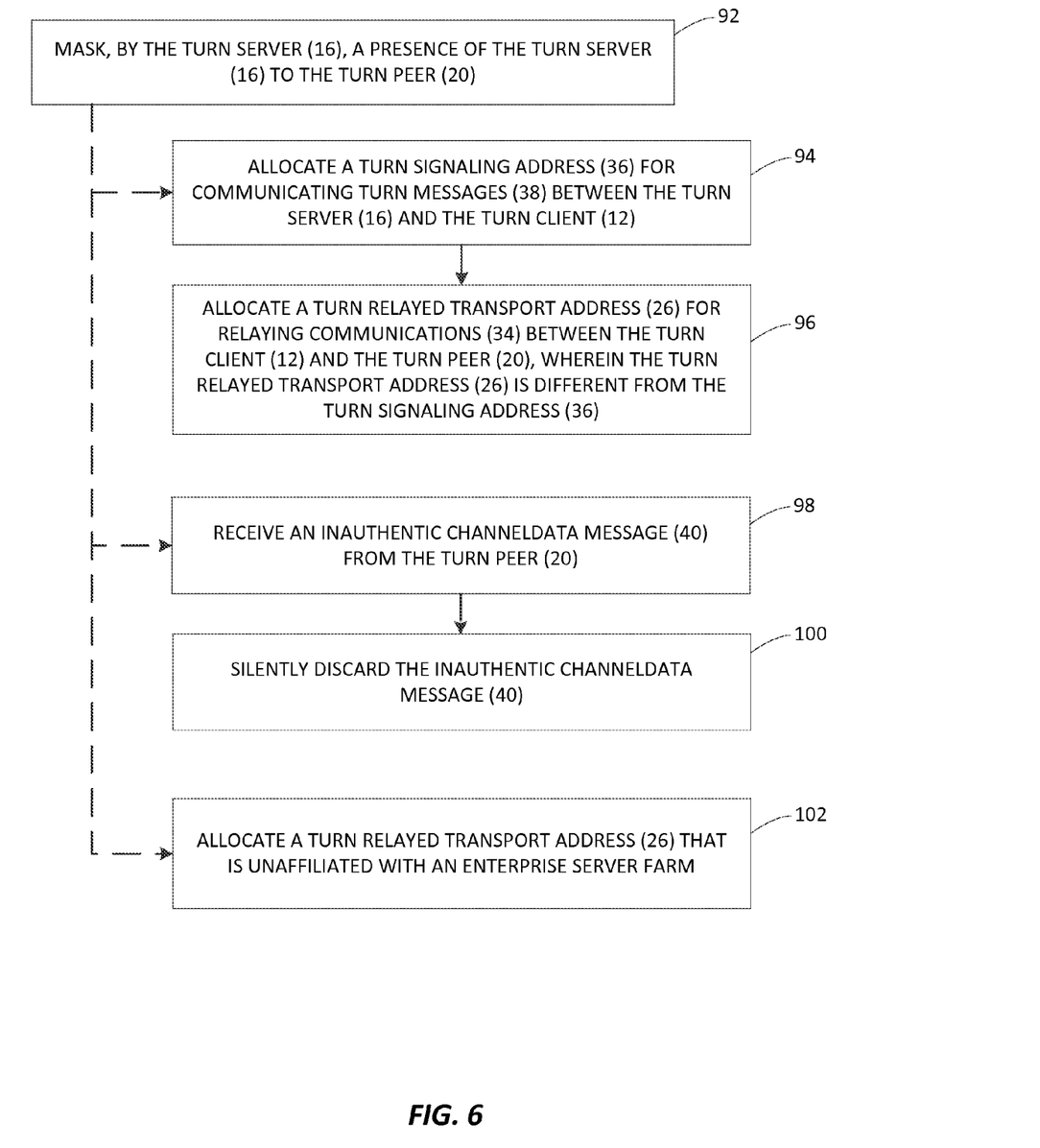
FIG. 6 is a flowchart illustrating further exemplary operations of the TURN server of FIG. 1 for masking a presence of the TURN server to a TURN peer.

FIG. 6 is a flowchart illustrating further exemplary operations of the TURN server 16 of FIG. 1 for masking the presence of the TURN server 16 to a TURN peer 20. Elements of FIG. 1 are referenced for the sake of clarity in describing FIG. 6. In FIG. 6, block 92 represents operations for masking a presence of the TURN server 16 to the TURN peer 20 (block 92). It is to be understood that the operations of block 92 of FIG. 6 correspond to the operations illustrated in block 88 of FIG. 5.

In some embodiments, the operations of block 92 for masking a presence of the TURN server 16 may include the TURN server 16 allocating a TURN signaling address 36 for communicating TURN messages 38 between the TURN server 16 and the TURN client 12 (block 94). The TURN server 16 also allocates a TURN relayed transport address 26 for relaying communications 34 between the TURN client 12 and the TURN peer 20, where the TURN relayed transport address 26 is different from the TURN signaling address 36 (block 96). By employing different addresses for TURN signaling and TURN relaying, the TURN server 16 may minimize the odds of TURN messages for signaling being associated with TURN relaying traffic by an observer.

Some embodiments may provide that the operations of block 92 for masking a presence of the TURN server 16 may include the TURN server 16 receiving an inauthentic ChannelData message 40 from the TURN peer 20 (block 98). The TURN server 16 then silently discards the inauthentic ChannelData message 40 (block 100). By silently discarding the inauthentic ChannelData message 40, the TURN server 16 avoids confirming its presence, as would be the case if the TURN server 16 sent an error response to the TURN peer 20.

According to some embodiments disclosed herein, the operations of block 92 for masking a presence of the TURN server 16 may include the TURN server 16 allocating a TURN relayed transport address 26 that is unaffiliated with an enterprise server farm (block 102). As noted above, a TURN relayed transport address 26 that appears to be affiliated with an enterprise server farm may indicate the presence of the TURN server 16 to an observer that conducts a reverse IP query on the TURN relayed transport address 26. Accordingly, by allocating a TURN relayed transport address 26 that is unaffiliated with an enterprise server farm, the TURN server 16 may further mask its presence to the TURN peer 20.

Figure 7:
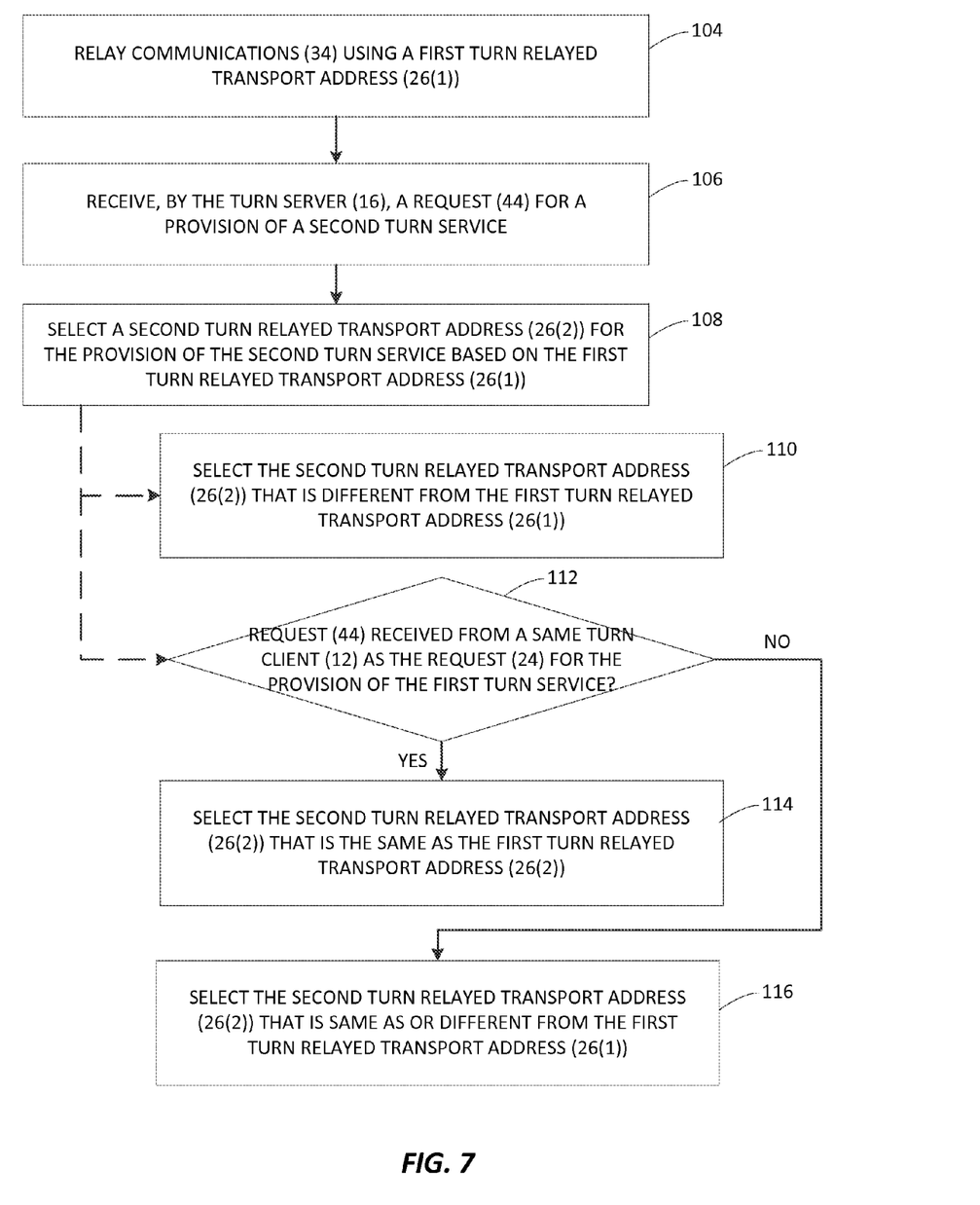
FIG. 7 is a flowchart illustrating further exemplary operations of the TURN server of FIG. 1 for obscuring a subsequent TURN connection by selecting a second TURN relayed transport address based on a first TURN relayed transport address.

FIG. 7 is a flowchart illustrating further exemplary operations of the TURN server 16 of FIG. 1 for obscuring a subsequent TURN connection by selecting a second TURN relayed transport address 26(2) based on a first TURN relayed transport address 26(1). For the sake of clarity, elements of FIG. 1 are referenced in describing FIG. 7. Operations in FIG. 7 begin with the TURN server 16 relaying communications 34 using a first TURN relayed transport address 26(1) (block 104). It is to be understood that the operations of block 104 of FIG. 7 correspond to the operations illustrated in block 90 of FIG. 5. The TURN server 16 may then receive a request 44 for a provision of a second TURN service (block 106). The request 44 may be, as a non-limiting example, a request for a second TURN allocation.

The TURN server 16 selects a second TURN relayed transport address 26(2) for the provision of the second TURN service based on the first TURN relayed transport address 26(1) (block 108). In some embodiments, the operations of block 108 for selecting the second TURN relayed transport address 26(2) may include the TURN server 16 selecting the second TURN relayed transport address 26(2) that is different from the first TURN relayed transport address 26(1) (block 110). In this manner, the TURN server 16 may relay communications 42(2) to the TURN client 12 without the TURN peer 20 being able to associate a single TURN relayed transport address 26 with the TURN client 12.

Some embodiments may provide that the operations of block 108 for selecting the second TURN relayed transport address 26(2) may include the TURN server 16 first determining whether the request 44 was received from a same TURN client 12 as the request 24 for the provision of a first TURN service (block 112). If the TURN server 16 determines at block 112 that the request 44 and the request 24 were received from the same TURN client 12, the TURN server 16 may select the second TURN relayed transport address 26(2) that is the same as the first TURN relayed transport address 26(1) (block 114). Communications 42(1) may then be relayed to the TURN client 12 without raising suspicion as to changing TURN relayed transport addresses 26 between communications sessions. Otherwise, if the TURN server 16 determines at block 112 that the request 44 and the request 24 were received from a client other than the TURN client 12, the TURN server 16 may select the second TURN relayed transport address 26(2) that is the same as or different from the first TURN relayed transport address 26(1), depending on the implementation of the TURN server 16 (block 116).

Figure 8:
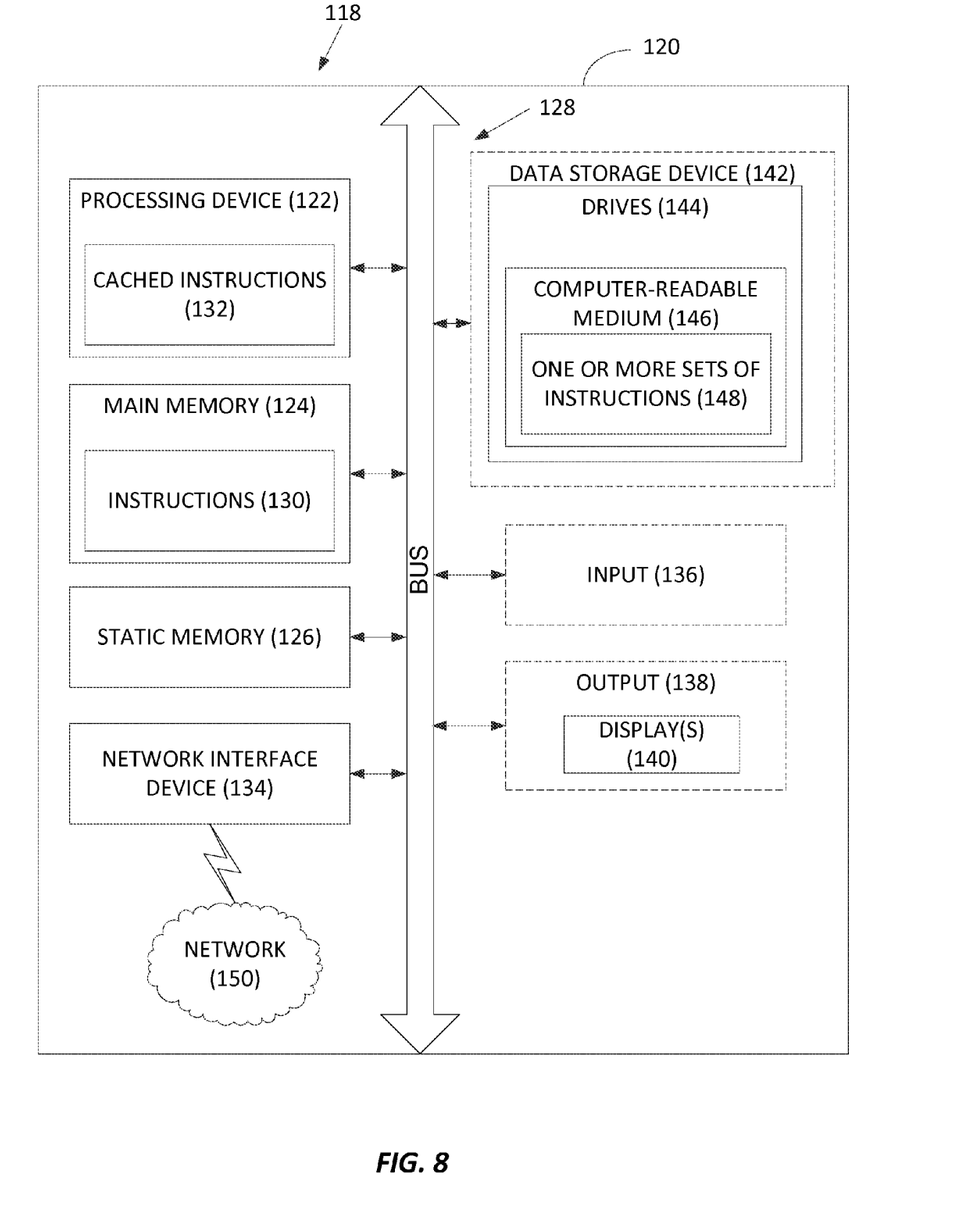
FIG. 8 is a block diagram of an exemplary processor-based system that may include the TURN client and/or the TURN server of FIG. 1.

FIG. 8 provides a block diagram representation of a processing system 118 in the exemplary form of an exemplary computer system 120 adapted to execute instructions to perform the functions described herein. In some embodiments, the processing system 118 may execute instructions to perform the functions of the TURN client 12 and/or the TURN server 16 of FIG. 1. In this regard, the processing system 118 may comprise the computer system 120, within which a set of instructions for causing the processing system 118 to perform any one or more of the methodologies discussed herein may be executed. The processing system 118 may be connected (as a non-limiting example, networked) to other machines in a local area network (LAN), an intranet, an extranet, or the Internet. The processing system 118 may operate in a client-server network environment, or as a peer machine in a peer-to-peer (or distributed) network environment. While only a single processing system 118 is illustrated, the terms "controller" and "server" shall also be taken to include any collection of machines that individually or jointly execute a set (or multiple sets) of instructions to perform any one or more of the methodologies discussed herein. The processing system 118 may be a server, a personal computer, a desktop computer, a laptop computer, a personal digital assistant (PDA), a computing pad, a mobile device, or any other device and may represent, as non-limiting examples, a server or a user's computer.

The exemplary computer system 120 includes a processing device or processor 122, a main memory 124 (as non-limiting examples, read-only memory (ROM), flash memory, dynamic random access memory (DRAM) such as synchronous DRAM (SDRAM), etc.), and a static memory 126 (as non-limiting examples, flash memory, static random access memory (SRAM), etc.), which may communicate with each other via a bus 128. Alternatively, the processing device 122 may be connected to the main memory 124 and/or the static memory 126 directly or via some other connectivity means.

The processing device 122 represents one or more processing devices such as a microprocessor, central processing unit (CPU), or the like. More particularly, the processing device 122 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 122 is configured to execute processing logic in instructions 130 and/or cached instructions 132 for performing the operations and steps discussed herein.

The computer system 120 may further include a communications interface in the form of a network interface device 134. It also may or may not include an input 136 to receive input and selections to be communicated to the computer system 120 when executing the instructions 130, 132. It also may or may not include an output 138, including but not limited to display(s) 140. The display(s) 140 may be a video display unit (as non-limiting examples, a liquid crystal display (LCD) or a cathode ray tube (CRT)), an alphanumeric input device (as a non-limiting example, a keyboard), a cursor control device (as a non-limiting example, a mouse), and/or a touch screen device (as a non-limiting example, a tablet input device or screen).

The computer system 120 may or may not include a data storage device 142 that includes using drive(s) 144 to store the functions described herein in a computer-readable medium 146, on which is stored one or more sets of instructions 148 (e.g., software) embodying any one or more of the methodologies or functions described herein. The functions can include the methods and/or other functions of the processing system 118, a participant user device, and/or a licensing server, as non-limiting examples. The one or more sets of instructions 148 may also reside, completely or at least partially, within the main memory 124 and/or within the processing device 122 during execution thereof by the computer system 120. The main memory 124 and the processing device 122 also constitute machine-accessible storage media. The instructions 130, 132, and/or 148 may further be transmitted or received over a network 150 via the network interface device 134. The network 150 may be an intra-network or an inter-network.

While the computer-readable medium 146 is shown in an exemplary embodiment to be a single medium, the term "machine-accessible storage medium" should be taken to include a single medium or multiple media (as non-limiting examples, a centralized or distributed database, and/or associated caches and servers) that store the one or more sets of instructions 148. The term "machine-accessible storage medium" shall also be taken to include any medium that is capable of storing, encoding, or carrying a set of instructions for execution by the machine, and that cause the machine to perform any one or more of the methodologies disclosed herein. The term "machine-accessible storage medium" shall accordingly be taken to include, but not be limited to, solid-state memories, optical and magnetic media, and carrier wave signals.

The embodiments disclosed herein may be embodied in hardware and in instructions that are stored in hardware, and may reside, as non-limiting examples, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. As non-limiting examples, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for obscuring Traversal Using Relays around Network Address Translator (TURN) connections, comprising:
   receiving, by a TURN server executing on a computing device, a request for a provision of a first TURN service from a TURN client to connect to a TURN peer;
   masking, by the TURN server, a presence of the TURN server to the TURN peer;
   relaying, by the TURN server, communications between the TURN client and the TURN peer using a first TURN relayed transport address, the relaying based on the masking;
   receiving, by the TURN server, a request for a provision of a second TURN service;
   selecting a second TURN relayed transport address for the provision of the second TURN service based on the first TURN relayed transport address; and
   relaying communications associated with the second TURN service using the second TURN relayed transport address.

2. The method of claim 1, wherein masking the presence of the TURN server comprises:
   allocating a TURN signaling address for communicating TURN messages between the TURN server and the TURN client; and
   allocating a TURN relayed transport address for relaying the communications between the TURN client and the TURN peer;
   wherein the TURN relayed transport address is different from the TURN signaling address.

3. The method of claim 2, wherein the TURN signaling address and the TURN relayed transport address reside in different subnets or different address blocks, or a combination thereof.

4. The method of claim 1, wherein masking the presence of the TURN server comprises:
   receiving, by the TURN server, an inauthentic ChannelData message from the TURN peer; and
   responsive to receiving the inauthentic ChannelData message, silently discarding the inauthentic ChannelData message.

5. The method of claim 1, wherein masking the presence of the TURN server comprises allocating a TURN relayed transport address that is unaffiliated with an enterprise server farm.

6. The method of claim 1, wherein selecting the second TURN relayed transport address based on the first TURN relayed transport address comprises selecting the second TURN relayed transport address to be different from the first TURN relayed transport address.

7. The method of claim 1, wherein selecting the second TURN relayed transport address based on the first TURN relayed transport address comprises:
   determining whether the request for the provision of the second TURN service was received from a same TURN client as the request for the provision of the first TURN service; and
   responsive to determining that the request for the provision of the second TURN service was received from the same TURN client as the request for the provision of the first TURN service, selecting the second TURN relayed transport address to be identical to the first TURN relayed transport address.

8. A system for obscuring Traversal Using Relays around Network Address Translator (TURN) connections, comprising:
   a TURN server executing on a first computing device, the TURN server communicatively coupled to a TURN client and configured to:
      receive a request for a provision of a first TURN service from the TURN client to connect to a TURN peer;
      mask a presence of the TURN server to the TURN peer;
      relay communications between the TURN client and the TURN peer using a first TURN relayed transport address, the relaying based on the masking;
      receive a request for a provision of a second TURN service;
      select a second TURN relayed transport address for the provision of the second TURN service based on the first TURN relayed transport address; and
      relay communications associated with the second TURN service using the second TURN relayed transport address.

9. A non-transitory computer-readable medium having stored thereon computer-executable instructions to cause a processor to implement a method for obscuring Traversal Using Relays around Network Address Translator (TURN) connections, comprising:
   receiving, by a TURN server executing on a computing device, a request for a provision of a first TURN service from a TURN client to connect to a TURN peer;
   masking, by the TURN server, a presence of the TURN server to the TURN peer;
   relaying, by the TURN server, communications between the TURN client and the TURN peer using a first TURN relayed transport address, the relaying based on the masking;
   receiving, by the TURN server, a request for a provision of a second TURN service;
   selecting a second TURN relayed transport address for the provision of the second TURN service based on the first TURN relayed transport address; and
   relaying communications associated with the second TURN service using the second TURN relayed transport address.

10. A method for obscuring Traversal Using Relays around Network Address Translator (TURN) connections, comprising:
    receiving, by a TURN server executing on a computing device, a request for a provision of a first TURN service from a TURN client to connect to a TURN peer;
    masking, by the TURN server, a presence of the TURN server to the TURN peer, the masking comprising:
       allocating a TURN signaling address for communicating TURN messages between the TURN server and the TURN client; and
       allocating a TURN relayed transport address for relaying the communications between the TURN client and the TURN peer;
       wherein the TURN relayed transport address is different from the TURN signaling address; and
    relaying, by the TURN server, communications between the TURN client and the TURN peer based on the masking.

11. A system for obscuring Traversal Using Relays around Network Address Translator (TURN) connections, comprising:
    a TURN server executing on a first computing device, the TURN server communicatively coupled to a TURN client and configured to:

receive a request for a provision of a first TURN service from the TURN client to connect to a TURN peer;

mask a presence of the TURN server to the TURN peer, the masking comprising:

allocating a TURN signaling address for communicating TURN messages between the TURN server and the TURN client; and allocating a TURN relayed transport address for relaying the communications between the TURN client and the TURN peer;

wherein the TURN relayed transport address is different from the TURN signaling address; and relay communications between the TURN client and the TURN peer based on the masking.

12. A non-transitory computer-readable medium having stored thereon computer-executable instructions to cause a processor to implement a method for obscuring Traversal Using Relays around Network Address Translator (TURN) connections, comprising:

receiving, by a TURN server executing on a computing device, a request for a provision of a first TURN service from a TURN client to connect to a TURN peer;

masking, by the TURN server, a presence of the TURN server to the TURN peer, the masking comprising:

allocating a TURN signaling address for communicating TURN messages between the TURN server and the TURN client; and allocating a TURN relayed transport address for relaying the communications between the TURN client and the TURN peer;

wherein the TURN relayed transport address is different from the TURN signaling address; and relaying, by the TURN server, communications between the TURN client and the TURN peer based on the masking.

\* \* \* \* \*